US007063171B2

(12) United States Patent
Totsu

(10) Patent No.: US 7,063,171 B2
(45) Date of Patent: Jun. 20, 2006

(54) MOTOR-DRIVEN ROTARY TOOL WITH INTERNAL HEATING TEMPERATURE DETECTING FUNCTION

(76) Inventor: Katsuyuki Totsu, 32-13, Oshiage 1-chome, Sumida-ku, Tokyo (JP)

( * ) Notice: Subject to any disclaimer, the term of this patent is extended or adjusted under 35 U.S.C. 154(b) by 0 days.

(21) Appl. No.: 10/432,472

(22) PCT Filed: Jan. 22, 2002

(86) PCT No.: PCT/JP02/00409

§ 371 (c)(1), (2), (4) Date: May 22, 2003

(87) PCT Pub. No.: WO02/060651

PCT Pub. Date: Aug. 8, 2002

(65) Prior Publication Data

US 2004/0050566 A1 Mar. 18, 2004

(30) Foreign Application Priority Data

Jan. 31, 2001 (JP) ............................ 2001-023194

(51) Int. Cl.
*B23Q 5/28* (2006.01)

(52) U.S. Cl. ...................... 173/181; 173/182; 173/183

(58) Field of Classification Search ................... 173/6, 173/7, 180, 181, 182, 183; 310/50, 68 C; 318/611; 361/25
See application file for complete search history.

(56) References Cited

U.S. PATENT DOCUMENTS 4,306,264 A 12/1981 Alessio
4,487,270 A * 12/1984 Huber ........................ 173/176
4,547,826 A * 10/1985 Premerlani .................. 361/25
4,613,800 A * 9/1986 Jeppsson .................... 318/434

(Continued)

FOREIGN PATENT DOCUMENTS

JP 8-192370 7/1996

*Primary Examiner*—Rinaldi I. Rada
*Assistant Examiner*—Nathaniel Chukwurah
(74) *Attorney, Agent, or Firm*—Koda & Androlia

(57) ABSTRACT

An electric motor-driven rotary tool with an elevated temperature detection function, provided by a temperature sensor, connected to a power shut off device, for shutting off power to the tool, in order to prevent injury, such as low temperature burn, from occurring to an operator of the tool, due to heating of the electric motor, encased in a housing having a holding part for the motor-driven rotary tool, causing an increase of the temperature of the housing, especially the holding part of the tool thereon, to a temperature capable of causing such burn injury to the operator of the tool. The motor-driven rotary tool, includes the electric motor in the housing therefor, the electric motor being for driving workpieces, such as a screwdriver, attached to the motor, for performing operations such as screw tightening; a torque setting and automatic stopping device for detecting a load torque generated in the rotary tool after the specified operations are completed, and for stopping the driving of the rotary tool when the load torque reaches a preset torque value; a temperature sensor installed in the housing of the electric motor for measuring an increase in the temperature of the housing, especially the holding part; and a power shutdown device for detecting a heated state of the housing by the temperature sensor, and shutting off power to the motor when the temperature of the housing increases to at least 55° C. due to heat generated by the electric motor.

4 Claims, 2 Drawing Sheets

U.S. PATENT DOCUMENTS

| | | | | | |
|---|---|---|---|---|---|
| 4,685,050 | A | * | 8/1987 | Polzer et al. | 700/32 |
| 5,154,242 | A | * | 10/1992 | Soshin et al. | 173/178 |
| 5,170,358 | A | * | 12/1992 | Delio | 700/177 |
| 5,323,287 | A | * | 6/1994 | Peter | 361/24 |
| 5,563,482 | A | | 10/1996 | Shaw et al. | |
| 5,636,698 | A | * | 6/1997 | Estep et al. | 173/2 |
| 5,687,066 | A | * | 11/1997 | Cook, II | 363/89 |
| 6,122,153 | A | * | 9/2000 | Becker | 361/25 |
| 6,237,698 | B1 | * | 5/2001 | Carrier et al. | 173/2 |
| 6,297,573 | B1 | * | 10/2001 | Roth-Stielow et al. | 310/68 C |
| 6,301,090 | B1 | * | 10/2001 | Mack | 361/25 |
| 6,536,536 | B1 | * | 3/2003 | Gass et al. | 173/2 |

* cited by examiner

MOTOR-DRIVEN ROTARY TOOL WITH INTERNAL HEATING TEMPERATURE DETECTING FUNCTION

BACKGROUND OF THE INVENTION

The present invention relates to a motor-driven rotary tool (e.g., an electric screwdriver) driven by an electric motor, and particularly relates to a motor-driven rotary tool equipped with an internal heating temperature detection function that is configured such that, when the electric motor housed within the holding part is used continuously over an prolonged period, to prevent injury (e.g., low-temperature burn) to the operator as the result of the increase in the temperature at the holding part of the motor-driven rotary tool resulting from the heating of the electric motor, a temperature sensor is provided in the casing, or the like of the electric motor to detect an abnormal temperature increase in the casing, or the like as the result of the heating of the electric motor and to then shut down the power-supply circuit of the electric motor, thereby stopping the driving of the motor-driven rotary tool.

Conventionally, as a motor-driven rotary tool (e.g., an electric screwdriver) that is driven by means of an electric motor, a motor-driven rotary tool equipped with an automatic stopping means configured as follows is known: The driving of the electric motor performs such work as screwing by driving a rotary tool such as a screwdriver bit; the rotary tool is equipped with a torque detection means that detects the load torque that occurs in the rotary tool during the work specified previously; and after the load torque reaches the preset torque, the aforementioned torque detection means detects this state and stops the driving of the rotary tool.

For example, an electric screwdriver or the like, configured as follows has been proposed and implemented: When a screw or the like is driven and a strong opposing load is exerted on the driver bit, a clutch mechanism that operates at a preset tightening torque detects that a specified torque has been reached, after which the aforementioned clutch mechanism is activated to temporarily break the connection between the electric motor's output shaft and the driver bit. Furthermore, an electric screwdriver (Japan Patent Application Publication No. 60-13798) or the like that also has been developed and put to practical use is configured such that, when the aforementioned clutch mechanism is activated, a limit switch or the like detects this state and stops the driving of the electric motor.

When a switching circuit is provided in the power-supply circuit of an electric screwdriver, or the like, having a driver bit that is rotary-driven by an electric motor, and the load current that flows in the power-supply circuit as the aforementioned electric motor is driven reaches the specified tightening torque near the end of the tightening, the load current increases to an overload current above a specified value. Therefore, an electric screwdriver (Japan Patent Application Publication No. 57-43389) or the like equipped with an automatic power shutdown device and configured as follows also was provided: The overload current state is detected and the supply of driving current to the electric motor is cut off, and after a given amount of time elapses, the supply of driving current to the electric motor is restored. Moreover, a switch mechanism is provided in the armature circuit of the electric motor, and the aforementioned electric motor armature circuit is short-circuited when the aforementioned switching circuit cuts off the supply of driving current to the electric motor, thereby instantaneously stopping the electric motor by means of regenerative braking. Furthermore, the aforementioned switching circuit transitions to the OFF state only for a given amount of time, so the following functionality is provided: Regarding the timing for performing the next screw-tightening operation, the switching circuit is restored automatically and transitions to the ON state, so it is possible to drive the electric motor and immediately begin the next screw-tightening operation.

However, in this type of motor-driven rotary tool, when the operator continuously uses the electric motor for a long time during manual labor, the electric motor heats and the temperature increase of the casing or the like is transmitted to the holding part of the motor-driven rotary tool, thereby risking a so-called low-temperature burn caused by the inflammation that reaches the surface and interior of the skin of the operator's hand. That is, it was ascertained that, even when the temperature of the holding part directly contacted by the operator's hand is within the range 45° C. to 65° C., continuous, prolonged contact (e.g., at least 2 hours) results in a low-temperature burn such that the degree of inflammation of the surface and interior of the contacting skin increases with the contact time, and considerable effort and time are required for therapy and recovery.

Therefore, as a result of assiduous study and a series of prototypes, the inventors confirmed that, when the temperature of the holding part of a motor-driven rotary tool directly contacted by the operator's hand reaches a temperature at which a low-temperature burn occurs readily (i.e., 45° C. to 65° C.), the temperature of the casing or the like resulting from the heating of the internal electric motor usually has risen to 55° C. to 75° C. Based on this perspective, the inventors were able to determine that, when a temperature sensor is installed in the casing or the like of an electric motor housed within the holding part of the aforementioned motor-driven rotary tool and the temperature of the casing or the like of the aforementioned electric motor reaches 55° C. to 75° C. or higher, if the rotary tool is provided with means such that this state is detected by the aforementioned temperature sensor and the power-supply circuit of the electric motor is shut down, thereby stopping the driving of the electric motor, it is possible to interrupt the operator's work by stopping the operation as a motor-driven rotary tool, thereby conveniently and easily preventing the occurrence of injury caused by low-temperature burn.

Consequently, the purpose of the present invention is to provide a motor-driven rotary tool equipped with an internal heating temperature detection function that enables the convenient and easy prevention of injury (e.g., low-temperature burn) to the operator caused by the heat of the electric motor housed within the holding part of the motor-driven rotary tool.

SUMMARY OF THE INVENTION

To achieve the aforesaid objectives, the motor-driven rotary tool equipped with the internal heating temperature detection function of the present invention is characterized in that, in a motor-driven rotary tool such that the electric motor is housed within the holding part and operations such as screw-tightening are performed by driving the rotary tool (e.g., a driver bit) by driving the aforementioned electric motor, and such that it is equipped with a torque setting and automatic stopping means that detects the load torque that occurs in the rotary tool upon the completion of the work specified previously and stops the driving of the rotary tool after the aforementioned load torque reaches a preset torque value, a temperature sensor is installed in the casing or the like of the electric motor housed within the holding part, and when the temperature of the casing or the like reaches 55° C. to 75° C. or higher as the result of the heating of the aforementioned electric motor, this state is detected by the aforementioned temperature sensor, and the provided power shutdown means stops the driving of the electric motor.

In this instance, the power shutdown means that stops the driving of the aforementioned electric motor can be configured so as to be equipped with a mechanism that restarts the electric motor after the temperature of the casing or the like drops below 55° C. and this state is detected by the aforementioned temperature sensor.

The power shutdown means that stops the driving of the aforementioned electric motor can be configured with a switch circuit that turns the electric motor on/off according to the temperature state detected by the temperature sensor.

(Explanation of Numerals)

Figure 1:
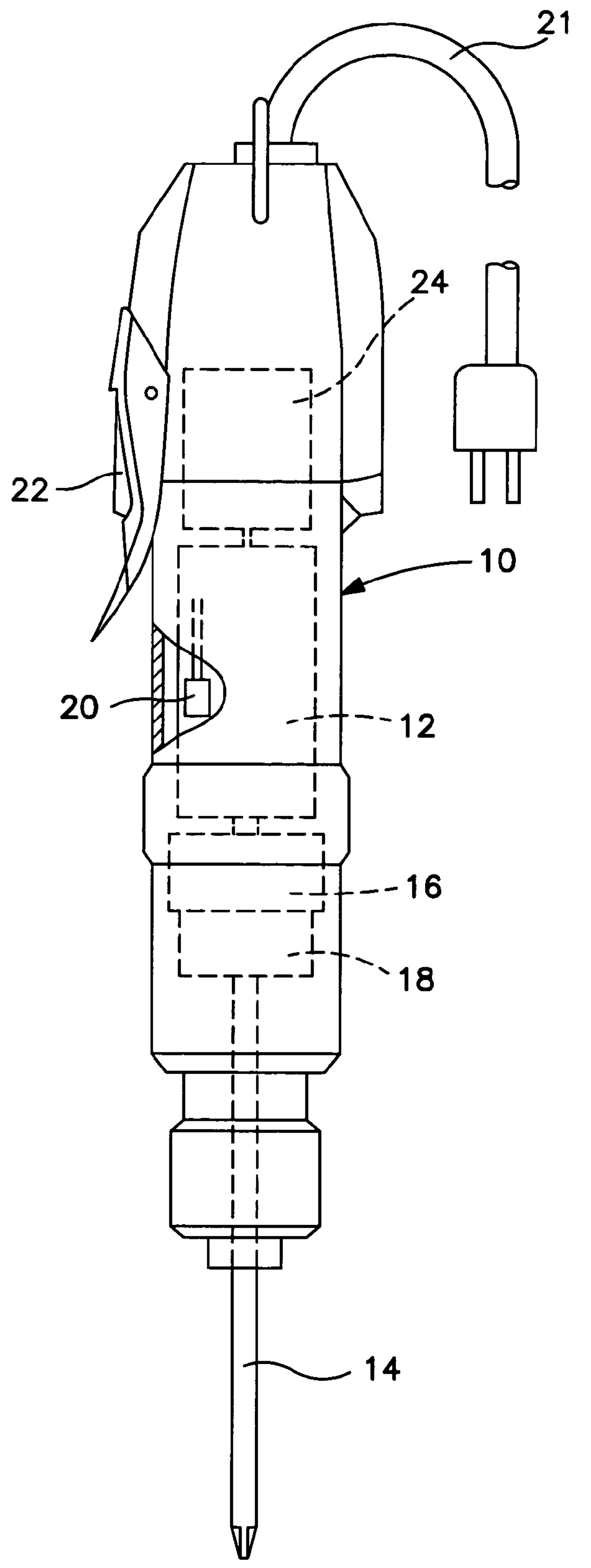
FIG. 1 is an illustration showing the general configuration of the motor-driven rotary tool equipped with the internal heating temperature detection function of the present invention.

10 Holding part of motor-driven rotary tool
12 Electric motor
14 Rotary tool
16 Deceleration means
18 Torque setting and automatic stopping means
20 Temperature sensor
21 Power cord
22 Power switch mechanism
24 Control unit
25 Power shutdown means

DETAILED DESCRIPTION OF THE INVENTION

Next, an embodiment of a motor-driven rotary tool equipped with the internal heating temperature detection function of the present invention will be explained in detail, with reference to the appended drawings.

FIG. 1 shows one embodiment of a motor-driven rotary tool equipped with the internal heating temperature detection function of the present invention. That is, in FIG. 1, reference symbol 10 indicates the holding part of the motor-driven rotary tool, and the electric motor 12 is housed within this holding part 10, and the rotary tool 14 (e.g., a driver bit) installed at the tip of the aforementioned holding part 10 is driven by the driving of this electric motor 12, thereby performing such operations as screw-tightening.

In this case, deceleration means 16, which is composed of a planetary gear mechanism, for example, is provided on the output shaft of the aforementioned electric motor 12. Furthermore, between this deceleration means 16 and the aforementioned rotary tool 14 is provided a torque setting and automatic stopping means 18 that detects the load torque that occurs in the aforementioned rotary tool 14 during work such as screw-tightening and stops the driving of the aforementioned rotary tool 14 when the aforementioned load torque reaches the preset torque value.

In the present embodiment of the motor-driven rotary tool configured thus, temperature sensor 20 is installed in the casing or the like of the electric motor 12 housed within the aforementioned holding part 10. It is configured such that this temperature sensor 20 detects the temperature of the casing or the like resulting from the heating of the aforementioned electric motor 12. Furthermore, in FIG. 1, reference symbol 21 indicates the power cord for supplying the external power that drives electric motor 12. Reference symbol 22 indicates the power switch mechanism for manually operating the drive control of electric motor 12. Moreover, reference symbol 24 indicates the control unit of electric motor 12.

Next, in the motor-driven rotary tool of the present embodiment, which is configured as aforementioned, the control of the driving of electric motor 12 by means of the aforementioned temperature sensor 20 will be explained with reference to FIG. 2.

Figure 2:
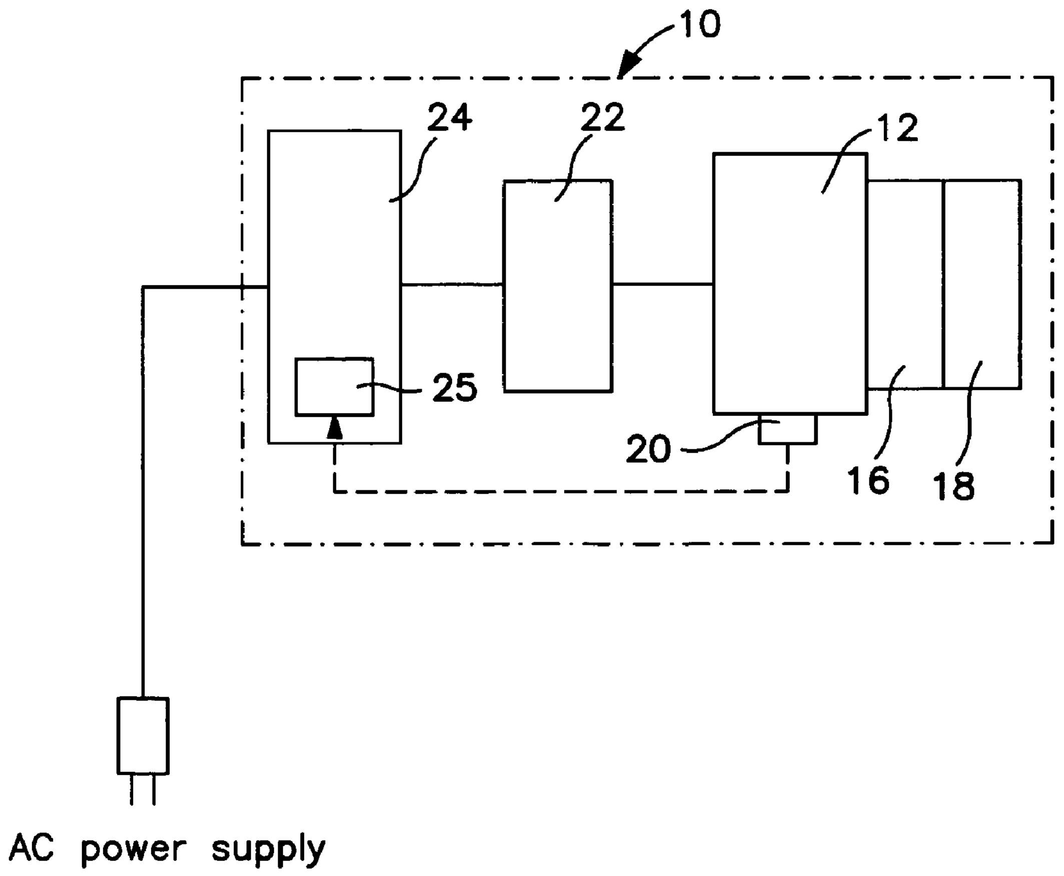
FIG. 2 is a block circuit diagram showing one embodiment of the control circuit of the electric motor in the motor-driven rotary tool equipped with the internal heating temperature detection function of the present invention.

FIG. 2 is a block circuit diagram showing one embodiment of the control circuit that uses temperature sensor 20 to control the driving of electric motor 12 in the motor-driven rotary tool configured as shown in FIG. 1. That is, the driving of electric motor 12 of the motor-driven rotary tool of the present embodiment is controlled by using external AC power (i.e., commercial power) and by using control unit 24 that is equipped with such functions as a torque control function and a power conversion function that yields the power output appropriate for driving electric motor 12 by converting this external AC power. This control unit 24 is housed within holding part 10, which also houses electric motor 12, as the integrated circuit-based, compact circuit board, and it is configured such that the obtained power-supply output is supplied to electric motor 12, via power switch mechanism 22, which is installed so as to be externally operable at the aforementioned holding part 10.

The electric motor 12 thus driven produces heat in the electric circuit block as the result of continuous use, thereby raising the temperature of the casing or the like of electric motor 12. The increased temperature of this casing or the like is transmitted to holding part 10 of the motor-driven rotary tool, and then is transmitted to the hand of the operator who operates the motor-driven rotary tool.

So, the present embodiment is configured such that, to prevent the temperature of holding part 10 directly contacted by the operator's hand from being within the range 45° C. to 65° C., for example, whereby continuous, prolonged contact (e.g., at least 2 hours) would result in a low-temperature burn such that the degree of inflammation of the surface and interior of the contacting skin would increase with the contact time, when temperature sensor 20 detects that the temperature of the casing or the like of electric motor 12 is 55° C. to 75° C. or higher, power shutdown means 25 provided in control unit 24 is turned off, thereby stopping the driving of electric motor 12.

Thus, after power shutdown means 25 is turned off once, even if the operator turns on power switch mechanism 22 of the motor-driven rotary tool, the driving of electric motor 12 remains stopped, so it is possible to interrupt the operator's work, thereby preventing the occurrence of injury as the result of a low-temperature burn.

Also, in the present invention, the power shutdown means 25 that stops the driving of the aforementioned electric motor 12 is configured such that, when the temperature of the casing or the like drops below 55° C., for example, the aforementioned temperature sensor 20 detects this state, and a reset mechanism restarts electric motor 12, thereby facilitating the use of the motor-driven rotary tool.

Furthermore, the power shutdown means 25 that stops the driving of the aforementioned electric motor 12 can be embedded easily in the aforementioned control unit 24, by configuring it so as to have a switch circuit that turns on/off depending on the temperature state detected by temperature sensor 20.

Although the preferred embodiment of the present invention was explained previously, the present invention is not limited to the aforementioned embodiment, so many design modifications are possible without departing from the spirit of the present invention.

As is evident from the aforementioned embodiment, according to the motor-driven rotary tool equipped with the internal heating temperature detection function of the present invention, in a motor-driven rotary tool such that the electric motor is housed within the holding part and operations such as screw-tightening are performed by driving the rotary tool (e.g., a driver bit) by driving the aforementioned electric motor, and such that it is equipped with a torque setting and automatic stopping means that detects the load torque that occurs in the rotary tool upon the completion of the work specified previously and stops the driving of the rotary tool after the aforementioned load torque reaches the preset torque value, a temperature sensor is installed in the casing or the like of the electric motor housed within the holding part, and when the temperature of the casing or the like reaches 55° C. to 75° C. or higher as the result of the heating of the aforementioned electric motor, this state is detected by the aforementioned temperature sensor, and the provided power shutdown means stops the driving of the electric motor. This simple configuration enables the convenient and easy prevention of injury (e.g., a low-temperature burn) to the operator caused by the heating of the electric motor housed within the holding part of the motor-driven rotary tool, and it enables enhanced safety and efficiency during various work by means of the motor-driven rotary tool.

The invention claimed is:

1. A hand held motor-driven rotary tool, comprising:

an electric motor;

a rotary tool driven by the motor;

a housing for housing the motor and for gripping by an operator of the tool;

a torque setting and automatic stopping device for detecting torque load applied to the rotary tool by engagement of the rotary tool with a workpiece and for stopping drive of the rotary tool when the torque load reaches a predetermined value; and a means for preventing injury to said operator of the rotary tool from low-temperature burn; said means comprising:

a temperature sensor on the housing for sensing predetermined temperature of the housing, said temperature being within a range of 45° C. to 65° C.; and a power shutdown device operatively connected to the temperature sensor for shutting down power to said electric motor in response to sensing by the temperature sensor of a temperature of the housing within a predetermined range of 45° C. to 65° C.

2. The motor-driven rotary tool according to claim 1, wherein said temperature sensor for sensing temperature range of said housing of 45° C. to 65° C. senses a temperature of said casing of said electric motor which is in a range of 55° C. to 75° C.

3. The motor-driven rotary tool according to claim 2, further comprising a reset device for restarting of the electric motor after shutdown thereof by the power shutdown device, the reset device being operatively connected to the power shutdown device for enabling restarting of the motor when the temperature of the housing decreases to below the predetermined range of 45° C. to 65° C.

4. The motor-driven rotary tool according to any one of claims 1, 2, and 3, wherein the power shutdown device comprises a switch circuit that is actuated when temperature of said housing sensed by the temperature sensor is at or above the predetermined range of 45° C. to 65° C.

* * * * *